United States Patent
Bookman et al.

(10) Patent No.: US 9,614,931 B2
(45) Date of Patent: Apr. 4, 2017

(54) IDENTIFYING A RESOURCE SET REQUIRE FOR A REQUESTED APPLICATION AND LAUNCHING THE RESOURCE SET IN A CONTAINER FOR EXECUTION IN A HOST OPERATING SYSTEM

(71) Applicant: Sphere 3D Inc., Mississauga (CA)

(72) Inventors: Peter G. Bookman, Huntsville, UT (US); Giovanni Morelli, Jr., Toronto (CA); Brandon Cowen, Mississauga (CA); Hussain Damji, Mississauga (CA)

(73) Assignee: SPHERE 3D INC., Mississauga, Ontario (CA)

( * ) Notice: Subject to any disclaimer, the term of this patent is extended or adjusted under 35 U.S.C. 154(b) by 0 days.

(21) Appl. No.: 14/600,246

(22) Filed: Jan. 20, 2015

(65) Prior Publication Data
US 2016/0210173 A1    Jul. 21, 2016

(51) Int. Cl.
G06F 9/455   (2006.01)
G06F 9/445   (2006.01)
H04L 29/08   (2006.01)

(52) U.S. Cl.
CPC .......... *H04L 67/34* (2013.01); *G06F 9/44521* (2013.01); *G06F 9/455* (2013.01); *G06F 9/45537* (2013.01); *H04L 67/06* (2013.01)

(58) Field of Classification Search
CPC .................................................. G06F 9/5027
See application file for complete search history.

(56) References Cited

U.S. PATENT DOCUMENTS

| 8,219,987 | B1 | 7/2012 | Vlaovic et al. |
| 8,667,459 | B2* | 3/2014 | Vlaovic .................... G06F 8/71 717/104 |
| 2001/0047393 | A1* | 11/2001 | Arner .................... G06F 9/4445 709/216 |

(Continued)

OTHER PUBLICATIONS

Oracle, Oracle VM Template Developer's Guide: Creating Pre-Built VMs for Rapid Software Deployment, Feb. 2009, An Oracle Technical White Paper.*

(Continued)

*Primary Examiner* — Abdullah Al Kawsar
*Assistant Examiner* — Jorge A Chu Joy-Davila

(57) ABSTRACT

Methods and systems for providing one or more software applications. The methods and systems involve receiving an application request from a user device identifying, at least, a software application to be provided by a host computer server; providing a resource library for the host computer server that defines the resources required for providing each software application; identifying, from the resource library, a set of resources required for providing the requested software application, the set of resources includes at least one resource required for an application operating system to support the requested software application; and providing the requested software application with the set of resources. The application operating system can be different from a host operating system at the host computer server. The set of resources can be launched as a containerized resource instance, which is operationally isolated from other containerized resource instances provided by the host computer server.

25 Claims, 7 Drawing Sheets

(56) References Cited

U.S. PATENT DOCUMENTS

| | | | | |
|---|---|---|---|---|
| 2006/0184931 | A1* | 8/2006 | Rochette | G06F 8/61 717/169 |
| 2007/0255798 | A1* | 11/2007 | Schneider | G06F 9/5077 709/217 |
| 2008/0104379 | A1* | 5/2008 | Peterman | G06F 9/44505 713/1 |
| 2008/0239985 | A1* | 10/2008 | Karve | H04L 41/0856 370/254 |
| 2008/0320145 | A1* | 12/2008 | Rivera | H04L 67/141 709/227 |
| 2009/0119664 | A1* | 5/2009 | Pike | G06F 9/45558 718/1 |
| 2009/0282404 | A1* | 11/2009 | Khandekar | G06F 9/45558 718/1 |
| 2009/0300057 | A1* | 12/2009 | Friedman | G06F 11/3664 |
| 2009/0313620 | A1* | 12/2009 | Sedukhin | G06F 8/61 718/1 |
| 2010/0306772 | A1* | 12/2010 | Arnold | G06F 8/36 718/1 |
| 2011/0295984 | A1* | 12/2011 | Kunze | G06F 8/62 709/220 |
| 2012/0084792 | A1* | 4/2012 | Benedek | G06F 9/544 719/313 |
| 2012/0117212 | A1* | 5/2012 | Fries | G06F 8/61 709/223 |
| 2013/0246932 | A1* | 9/2013 | Zaveri | G06F 3/017 715/740 |
| 2013/0304693 | A1* | 11/2013 | Jaeger | G06F 17/30563 707/602 |
| 2014/0068718 | A1* | 3/2014 | Mureinik | G06F 21/604 726/4 |

OTHER PUBLICATIONS

Kerner, Sean Michael, "10 Quick Facts About Docker Container Virtualization", Jun. 19, 2014, 2 pages.

Document relating to CA Patent Application No. 2,878,759, dated Feb. 11, 2015 (Office Action).

Document relating to CA Patent Application No. 2,878,759, dated May 11, 2015 (Office Action Response).

Document relating to CA Patent Application No. 2,878,759, dated May 29, 2015 (Notice of Allowance).

* cited by examiner

IDENTIFYING A RESOURCE SET REQUIRE FOR A REQUESTED APPLICATION AND LAUNCHING THE RESOURCE SET IN A CONTAINER FOR EXECUTION IN A HOST OPERATING SYSTEM

FIELD

The described embodiments relate to methods and systems for providing software applications.

BACKGROUND

Computer systems generally require, at least, an operating system and certain other system resources (hardware and/or software) to provide applications to users. Operating systems can generally operate as an intermediary between the system resources at the computer systems and the applications. Different operating systems are, therefore, available for different computer architectures.

Operating systems are generally configured to manage, at least, all the system resources at a computer system. Upon receipt of any application request, the computer system will typically implement the operating system in full even if only a subset of the functionality of the operating system is required for providing the requested application. Consequently, to provide the requested application, a computer system is likely to launch many unnecessary resources, such as a desktop environment, and requiring use of system computational and/or storage bandwidth for those unnecessary resources.

SUMMARY

The various embodiments described herein generally relate to methods (and associated systems configured to implement the methods) for providing one or more software applications.

In accordance with some embodiments, there is provided a method for providing one or more software applications at a host computer server. The host computer server can include, at least, a host memory for storing a host operating system and a host processor configured for operating the host operating system. The method can include: receiving an application request from a user device, where the application request can include an application identifier associated with a requested software application, the requested software application can be a software application to be provided by the host computer server, and the user device includes a device processor and a device memory; providing a resource library for the host computer server, where the resource library can define one or more resources required for providing each software application of the one or more software applications; identifying, from the resource library, a set of resources required for providing the requested software application based on the application identifier, where the set of resources can include at least one resource required for an application operating system to support the requested software application, the application operating system can be an operating system operable for providing the requested software application and the application operating system can be different from the host operating system; and providing the requested software application with the identified set of resources.

In some embodiments, the described methods can include operating the host processor to launch the set of resources as a containerized resource instance for providing the requested software application, where the containerized resource instance can be operationally isolated from one or more other containerized resource instances being provided by the host computer server.

In some embodiments, the described methods can include, prior to operating the host processor to launch the set of resources as the containerized resource instance for providing the requested software application, providing a session log for the host computer server, where the session log records one or more active containerized resource instances and, for each active containerized resource instance, one or more resources associated with that active containerized resource instance, and the one or more active containerized resource instances can be containerized resource instances currently provided by the host computer server; determining, from the session log, whether the one or more resources associated with at least one active containerized resource instance corresponds to the identified set of resources; and in response to determining the one or more resources associated with at least one active containerized resource instance corresponds to the identified set of resources, providing the requested software application with one of the at least one active containerized resource instance, otherwise, operating the host processor to launch the set of resources for providing the requested software application as a new containerized resource instance.

In some embodiments, the described methods can include providing an application interface at the host computer server, where the application interface can facilitate electronic communication between the one or more active containerized resource instances and the user device.

In some embodiments, the described methods can include allocating an application memory portion within the host memory for launching the set of resources, where the application memory portion can be dedicated for providing the requested software application and each containerized resource instance can be associated with a different application memory portion within the host memory; and launching the set of resources within the application memory portion.

In some embodiments, the application request can include, at least, a user identifier corresponding to a user account from which the application request was received, and the described methods can include providing a session log for the host computer server, where the session log can record the user identifier in association with the containerized resource instance providing the requested software application; and upon detecting the user device is not in electronic communication with the host computer server, continuing to provide the requested software application with the containerized resource instance for that user account.

In some embodiments, the described methods can include determining the requested software application is incompatible with the host operating system when at least one resource of the set of resources identified for the requested software application is inoperable at the host operating system; and if the requested software application is incompatible with the host operating system, then identifying an emulation application operable for providing the software application at the host operating system, where the emulation application can be operable for facilitating compatibility between the host operating system and the requested software application, otherwise, sending an error message to the user device to indicate the requested software application is unavailable.

In some embodiments, the described methods can include generating one or more resource templates, where each resource template can be a predefined resource set launchable by the host processor for providing at least one software application, and the predefined resource set can include one or more resources required for providing the at least one software application.

In accordance with some embodiments, there is provided a system for providing one or more software applications. The system can include: at least one storage component for storing, at least, a host operating system and a resource library defining one or more resources required for providing each software application of the one or more software applications; and a host processor configured for operating the host operating system. The host processor can be configured to: receive an application request from a user device, where the application request can include an application identifier associated with a requested software application, and the requested software application can be a software application to be provided; identify, from the resource library, a set of resources required for providing the requested software application based on the application identifier, where the set of resources can include at least one resource required for an application operating system to support the requested software application, the application operating system can be an operating system operable for providing the requested software application and the application operating system can be different from the host operating system; and provide the requested software application with the identified set of resources.

In accordance with some embodiments, the at least one storage component can include a host memory for storing the host operating system and one or more storage components for storing the resource library. The one or more storage components may be physically separate from the host memory.

In accordance with some embodiments, the host processor can be configured to launch the set of resources as a containerized resource instance for providing the requested application, where the containerized resource instance can be operationally isolated from one or more other containerized resource instances being provided.

In accordance with some embodiments, the at least one storage component can include a session log for recording one or more active containerized resource instances and, for each active containerized resource instance, one or more resources associated with that active containerized resource instance, where the one or more active containerized resource instances can be containerized resource instances currently provided by the host computer server; and the host processor can be configured, prior to launching the set of resources as the containerized resource instance for providing the requested software application, to: determine, from the session log, whether the one or more resources associated with at least one active containerized resource instance corresponds to the identified set of resources; and in response to determining the one or more resources associated with at least one active containerized resource instance corresponds to the identified set of resources, provide the requested software application with one of the at least one active containerized resource instance, otherwise, the host processor is configured to launch the set of resources for providing the requested software application as a new containerized resource instance.

In accordance with some embodiments, the host processor can be configured to provide an application interface for facilitating electronic communication between the one or more active containerized resource instances and the user device.

In accordance with some embodiments, the host processor can be configured to: allocate an application memory portion within the at least one storage component for launching the set of resources, where the application memory portion can be dedicated for providing the requested software application and each containerized resource instance can be associated with a different application memory portion within the at least one storage component; and launch the set of resources within the application memory portion.

In accordance with some embodiments, the application request can include a user identifier corresponding to a user account from which the application request was received. The at least one storage component may then include a session log for recording the user identifier in association with the containerized resource instance providing the requested software application; and the host processor can be configured, upon detecting the user device is not in electronic communication with the system, to continue to provide the requested software application with the containerized resource instance for that user account.

In accordance with some embodiments, the host processor can be configured to: determine the requested software application is incompatible with the host operating system when the requested software application is operable on a software architecture different from a software architecture of the host operating system; and if the requested software application is incompatible with the host operating system, then identify an emulation application operable for providing the software application at the host operating system, where the emulation application can be operable for facilitating compatibility between the host operating system and the requested software application, otherwise, the host processor is configured to send an error message to the user device to indicate the requested software application is unavailable.

The described systems can, in some embodiments, operate on a Microsoft™ Windows architecture.

In accordance with some embodiments, the host processor can be configured to: generate one or more resource templates, where each resource template can be a predefined resource set launchable by the host processor to provide at least one software application, and the predefined resource set can include one or more resources required for providing the at least one software application.

In some embodiments, the one or more resources identified in the resource library can include at least one of a binary file and a library file.

In some embodiments, the set of resources can include at least the requested software application.

The one or more resource templates can, in some embodiments, include at least one resource template launchable by the host processor for providing the at least one software application on a Windows-based operating system.

BRIEF DESCRIPTION OF DRAWINGS

Several embodiments will now be described in detail with reference to the drawings, in which.

Figure 1:
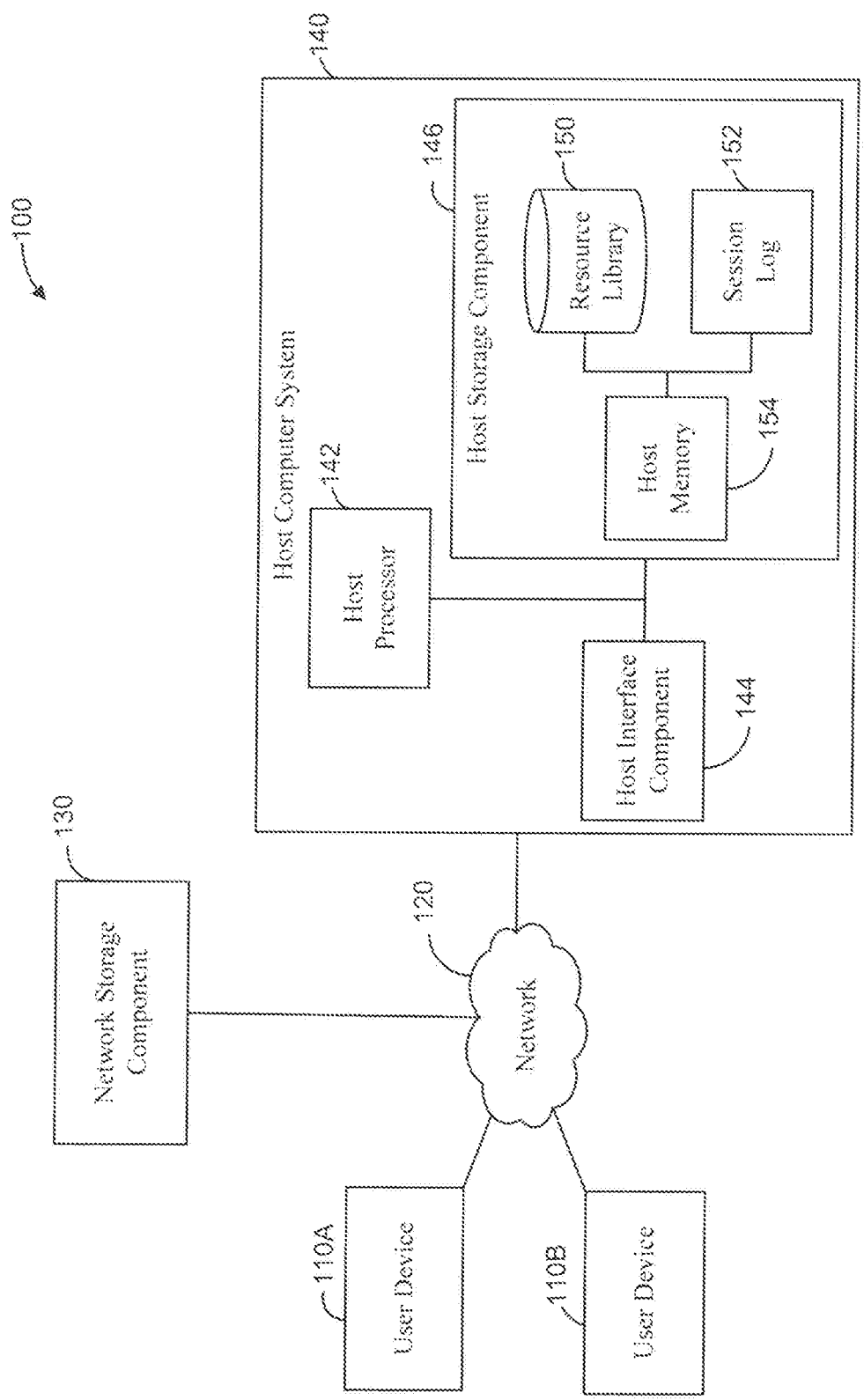
FIG. 1 is a block diagram illustrating a host computer system in communication with other components in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DESCRIPTION OF EXAMPLE EMBODIMENTS

The various embodiments described herein generally relate to methods (and related systems) for providing one or more software applications. As will be described, software applications can generally include any program file executable, or launchable, by a processor at a computer system for providing functionality to one or more user devices.

When the systems described herein receive an application request requesting a software application to be provided for a user device, the described systems can then operate to determine an application identifier from the application request and one or more resources required for providing the requested software application using the application identifier. The described systems can determine the required resources from a resource library that defines the resources required for providing various different software applications. The one or more resources, or set of resources, required for providing the software application can include system resources and/or application resources. System resources can include resources associated with an operating system configured for providing the software application. Application resources can include resources that are specific to providing the software application itself.

After determining the set of resources required for providing the requested software application, the described systems can then operate to provide the requested software application with the identified set of resources. By providing the software applications with the required set of resources, the described systems can likely use less computational and/or storage bandwidth for providing the software application in comparison with systems that implement complete instances of each operating system regardless of the set of resources required for providing the requested software application.

The described systems may also provide the software applications by launching the set of resources in a containerized resource instance. As will be described, the containerized resource instance can generally be operationally isolated from other containerized resource instances so that the operation of one containerized resource instance would not affect the operation of the other containerized resource instances. It may be possible for a containerized resource instance to be used for fulfilling multiple application requests, as will be described. As a result, further reduction in computational and/or storage bandwidth may be possible with the systems and methods described herein.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is first made to FIG. 1, which is an example block diagram 100 illustrating a host computer system 140 in communication with one or more components.

The host computer system 140 may communicate with one or more user devices 110, such as 110A and 110B, and a network storage component 130 via a network 120. Similarly, each user device 110 may communicate with the network storage component 130 via the network 120. It will be understood that, although two user devices, namely 110A and 110B, are illustrated in FIG. 1, a fewer or a greater number of user devices 110 may communicate with the host computer system 140 via the network 120.

As shown in FIG. 1, the host computer system 140 can include one or more components, such as a host processor 142, a host interface component 144, and a host storage component 146. The host processor 142, the host interface component 144, and the host storage component 146 may be combined into a fewer number of components or may be separated into further components. Also, the host processor 142, the host interface component 144, and the host storage component 146 may be implemented in software or hardware, or a combination of software and hardware.

In some embodiments, the host computer system 140 may be provided using one or more user devices 110 described herein.

Also, for ease of exposition, only one host computer system 140 is shown in FIG. 1. It will be understood that multiple host computer systems 140 may be distributed over a wide geographic area and be in electronic communication with each other, and with the other components shown in FIG. 1, via the network 120.

The host processor 142 may generally be configured to control the operation of the host computer system 140. For example, the host processor 142 can initiate and manage the operations of each of the other components at the host computer system 140. The host processor 142 may also determine, based on received and/or stored data, user preferences and/or predefined settings, how the host computer system 140 may generally operate.

The host processor 142 may be any suitable processor(s), controller(s) and/or digital signal processor(s) that can provide sufficient processing power depending on the configuration, purposes and requirements of the host computer system 140. In some embodiments, the host processor 142 can include more than one processor with each processor being configured to perform different dedicated tasks.

The host interface component 144 may be any interface that enables the host computer system 140 to communicate with other devices and systems. In some embodiments, the host interface component 144 can include at least one of a serial port, a parallel port or a USB port. The host interface component 144 may also include at least one of an Internet, Local Area Network (LAN), Ethernet, Firewire™, modem or digital subscriber line connection. Various combinations of these elements may be incorporated within the host interface component 144. For example, the host interface component 144 may receive an application request from the user device 110 via the network 120.

Also, the host interface component 144 may include an application interface for facilitating electronic communication between any of the containerized resource instances being provided by the host computer system 140 and the user devices 110. The application interface may include a manager application that can enable the user device 110 to access one or more active containerized resource instances. Briefly referring to FIG. 3B, which is an example computer architecture diagram 300B for the host computer system 140. As shown in FIG. 3B, an application interface 360 can be provided for managing access to the various different software applications 310a to 310d being provided by the host computer system 140.

The host storage component 146 can generally store data and/or resources associated with providing software applications by the host computer system 140. For example, the host storage component 146 can store resource data that define the resources required for providing each software application. One or more of the resources may be stored at the host storage component 146, and/or at the network storage component 130. Session data related to each application request and corresponding application session may also be stored in the host storage component 146.

Depending on the requirements and design of the host computer system 140, the host storage component 146 can include one or more storage and/or database components for storing the various different data and/or resources. For example, as shown in FIG. 1, the host storage component 146 can include a resource library 150, a session log 152 and a host memory 154.

The resource library 150 can include suitable data storage elements, such as one or more databases. Generally, the resource library 150 can store data for defining the resources required for providing the software applications. The resource library 150 may define the resources required for providing the software applications that the host computer system 140 can be configured to provide. For example, the host processor 142 may identify, from the resource library 150, a set of resources required for providing a requested software application for the user device 110. It will be understood that the resource library 150 may similarly be provided as another type of storage component.

In some embodiments, the resource library 150 may also store data related to resource templates. A resource template may generally include one or more resources grouped together as a predefined resource set, and can be launched by the host processor 142 for providing at least one software application. In some embodiments, at least one resource template can be associated with providing a software application on a Microsoft Windows™-based operating system, such as, but not limited to, Windows 7™, Windows XP™, Windows Vista™, Windows ME™, Windows 8™, etc.

Instead of defining the resources required for providing a particular software application individually, the resource library 150 can include a resource template for more commonly requested software applications. It is possible that some resource templates may include two or more resources that are more commonly required for providing various software applications, but require other resources in order to provide any software applications. The resource templates can, as a result, minimize the processing required by the host processor 142 for providing certain software applications.

For example, a resource template can include the resources required for providing the software application, CorelDRAW™. The resource template can include the various resources required for providing CorelDRAW, such as certain binary files and library files associated with Windows 7, such as, but not limited to, the system binary file, "ntoskrnl.exe", and the library file, "Win32k.dll". It will be understood that the listed example files are merely for illustration and that other binary and library files may be required. When the host computer system 140 receives an application request corresponding to CorelDRAW, the host processor 142 can determine from the resource library 150 that the resources required for providing CorelDRAW is the resource template, which includes the multiple resources required for providing CorelDRAW. As a result, the host processor 142 does not need to retrieve the various required resources individually.

The session log 152 can include suitable data storage elements, such as one or more databases, for recording data associated with containerized resource instances that are active, or currently being provided by the host computer server 140 (referred herein as "active containerized resource instances"). The session log 152 may define the active containerized resource instances being currently provided by the host computer system 140. An entry in the session log 152 can identify, for a particular software application being provided, the resources that have been launched for providing that software application, user data associated with a user account for which the software application is being provided (e.g., user identifier corresponding to the user account, etc.) and an application identifier corresponding to the software application being provided. It will be understood that other information may also be provided in the session log 152.

The host memory 154 may also store data and/or resources for providing the software application at the host computer system 140. The host memory 154 can generally include RAM, ROM, one or more hard drives, or some other data storage elements, such as disk drives. The host memory 154 may store the host operating system that is operated by the host processor 142. The host operating system can provide various basic operational processes for the host computer system 140. In some embodiments, the host operating system may include an operating system that operates on the Windows architecture, such as Windows Server 2008™.

Also, the host memory 154 may be configured such that portions may also be allocated as application memory portions for providing the requested software applications, as will be described. Each application memory portion can be dedicated for that containerized resource instance.

Although not explicitly shown in FIG. 1, the host storage component 146 may also store other data and/or resources associated with providing software applications at the host computer system 140. For example, various user data may also be stored at the host storage component 146. Each user is associated with a user account and each user account can be associated with a corresponding user identifier. The user account can include personal information (e.g., user name, contact information, etc.), user preferences associated with the host computer system 140 and other relevant user information.

The host storage component 146 may, in some embodiments, also store the resources required for providing the software applications (e.g., binary files and library files associated with various different operating systems, resource templates defined for certain software applications and/or operating systems, etc.) as well as the software applications themselves. When the resources are not being used by the host computer system 140 for providing software application(s), the host processor 142 may operate to apply the related software updates to the resources. The host computer system 140 may receive the software updates, or an update indication that software updates are available, from the software providers via the network 120. In response to receiving the software updates or the update indication from the software providers, the host computer system 140 can determine an operational status of the relevant resource. When the resource is not being used for providing a software application, the resource may have the operational status of available and the host processor 142 can then operate to update the available relevant resource. When the resource is being used for providing a software application, the resource may have the operational status of unavailable and the host processor 142 can indicate in the resource library 150 that the software update is required for the resource. The host processor 142 can then operate to monitor the operational status of the relevant resource and to apply the software update in response to a change in the operational status to the available status.

Referring still to FIG. 1, the network storage component 130 can also store certain data and/or resources associated with providing the software applications by the host computer system 140. For example, the network storage component 130 may store the resources that are less frequently required and/or data that is not as frequently accessed by the host computer system 140 and/or the user devices 110 in order to more effectively allocate the storage capacity of the host storage component 146. In some embodiments, the network storage component 130 may operate as a back-up storage component for the host computer system 140, and receive, at predefined time intervals, data already stored at the host storage component 146.

Also, in embodiments where multiple host computer systems 140 are provided, the network storage component 130 may store data and resources that are common to the various host computer systems 140.

The user devices 110 may be any networked computing device operable to connect to the network 120. A networked device is a device capable of communicating with other devices through a network such as the network 120. A networked device may couple to the network 120 through a wired or wireless connection.

These computing devices may include at least a processor and memory (not shown), and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, these computing devices may be a laptop, or a smartphone device equipped with a network adapter for connecting to the Internet. In some embodiments, the connection request initiated from the user devices 110 may be initiated from a web browser application stored at the user device 110 and directed at a browser-based application at the host computer system 140 for receiving the connection request. For example, the connection request may also include an authentication request for obtaining access to a user account at the host computer system 140 for a user operating the user device 110A. The host computer system 140 can then receive application requests from the user device 110A via the user account.

The network 120 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satelite, mobile, wireless (e.g. Wi-Fi™,WiMAX™), SS7 signaling network, fixed line, local area network, wide area network, and others, including any combination of these, capable of interfacing with, and enabling communication between the host computer system 140, the network storage component 130 and/or the user devices 110.

Figure 2:
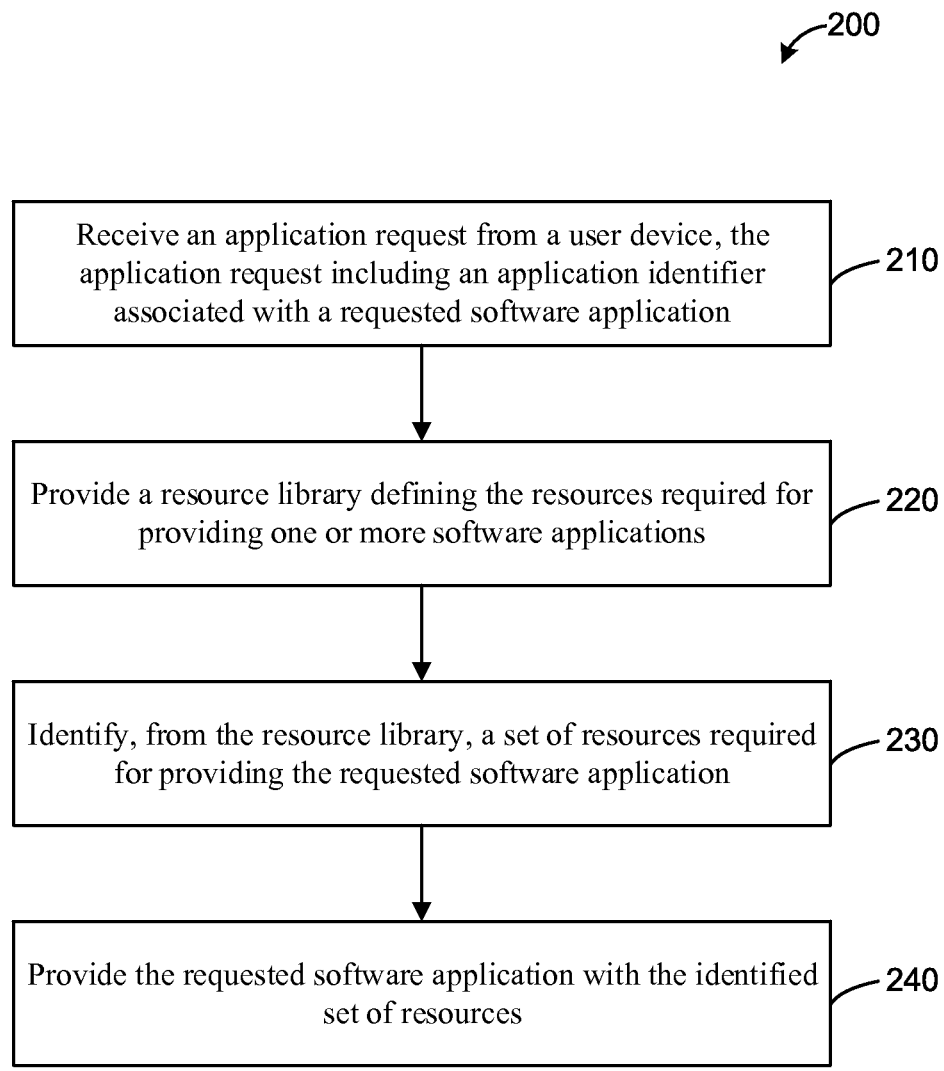
FIG. 2 is a flowchart of an example method for providing one or more software applications.

Referring now to FIG. 2, which is a flowchart 200 of an example method for providing one or more software applications. To illustrate the example method in FIG. 2, reference will be made simultaneously to FIGS. 3A to 6, which illustrate various example computer architecture diagrams of the host computer system 140.

At 210, the host computer system 140 receives an application request from a user device, such as 110A or 110B.

The application request can include various information, such as data related to the software application to be provided by the host computer system 140. For example, the application request can include an application identifier associated with the software application being requested. The application request may, in some embodiments, also include data associated with the user account from which the application request was provided to the host computer system 140.

The software application as identified in the application request can generally include any program that is executable, or launchable, by the host processor 142 for providing functionality to the user device 110. Example software applications can include, but is not limited to, various text, image, and/or video processing tools or programs (e.g., Microsoft WORD™, CorelDRAW, etc.), gaming applications, software development tools and/or applications, etc.

At 220, the host computer system 140 provides the resource library 150.

As described, the resource library 150 can be stored at the host storage component 146 and/or the network storage component 130. The resource library 150 can generally define one or more resources required for providing each software application of the one or more software applications.

Generally, the resources required for providing the software application can include application resources, which are specific to providing the software application, and/or system resources, which are specific to the software architecture and/or operating systems on which the software application is to be provided. In typical computer systems, a complete instance of an operating system and related system resources, such as the desktop environment, are launched for providing any software applications. As a result, those computer systems typically launch resources that are unnecessary for providing the specific software application and also occupy unnecessary computational and storage bandwidth. With the methods described herein, the host computer system 140 can provide the software applications with fewer resources, as compared to the typical computer systems, since the host computer system 140 can provide a particular software application by launching the required resources for that software application, as determined from the resource library 150.

In some embodiments, the resources required for providing a software application can include one or more binary files and/or one or more library files. Each of the binary file and the library file can be specific to a software architecture, such as Windows, and/or an application operating system (e.g., Windows 7, Windows XP, etc.). The application operating system is an operating system for supporting the requested software application, and is different from the host operating system. Generally, the host operating system is a basic operating system for providing basic functionalities, such as file systems, at the host computer system 140 (e.g., Windows Server 2008) whereas the application operating systems are configured for providing various functionalities to the user devices 110 through the software applications (e.g., Windows 7). The host operating system can generally provide a kernel that can be common to the various application operating systems and on which the application operating systems can be provided.

For example, a software application may be designed for the Windows software architecture and configured to be compiled with Microsoft's Visual C++™ compiler. To provide that software application, the resource library 150 can indicate that the resources required for providing that software application includes, at least, library files for the Visual C+ compiler, such as C-style input/output calls and/or C-style memory allocation.

Another example software application may also be designed for the Windows software architecture but configured for another compiler, such as compiler based on C# or another Microsoft .NET™ language. To launch that software application, the resource library 150 can indicate that the resources required include, at least, the library files within the Microsoft .NET framework, which are different from the resources required for providing the software application configured for the Visual C++ compiler.

At 230, the host computer system 140 identifies, from the resource library 150, a set of resources required for providing the requested software application based on the application identifier.

To provide the requested software application, the host processor 142 can operate to determine, from the resource library 150, the one or more resources, or the set of resources, required for providing the software application.

Figure 3A:
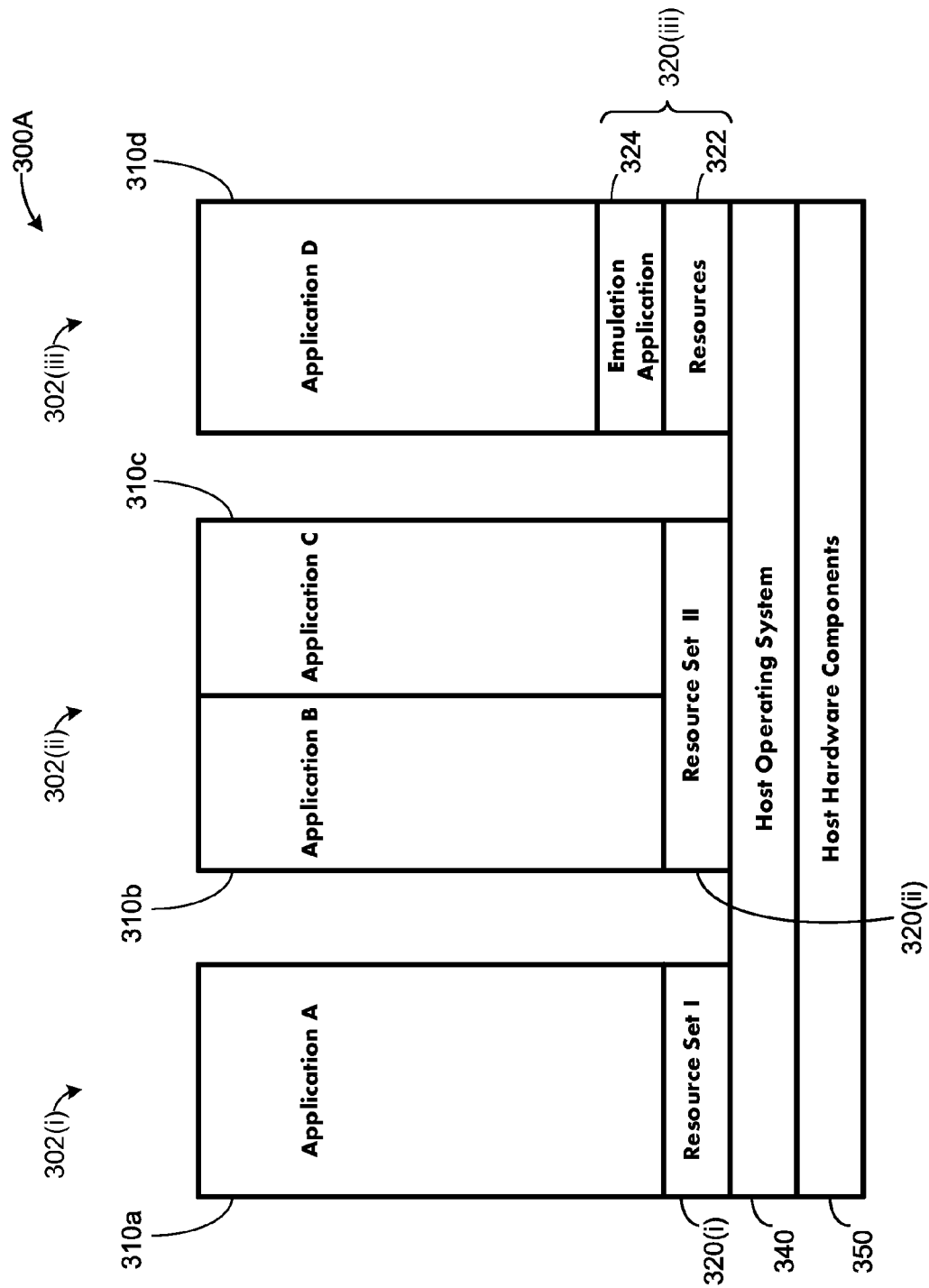
FIGS. 3A and 3B are computer architecture diagrams of a host computer system in accordance with example embodiments.
Figure 3B:
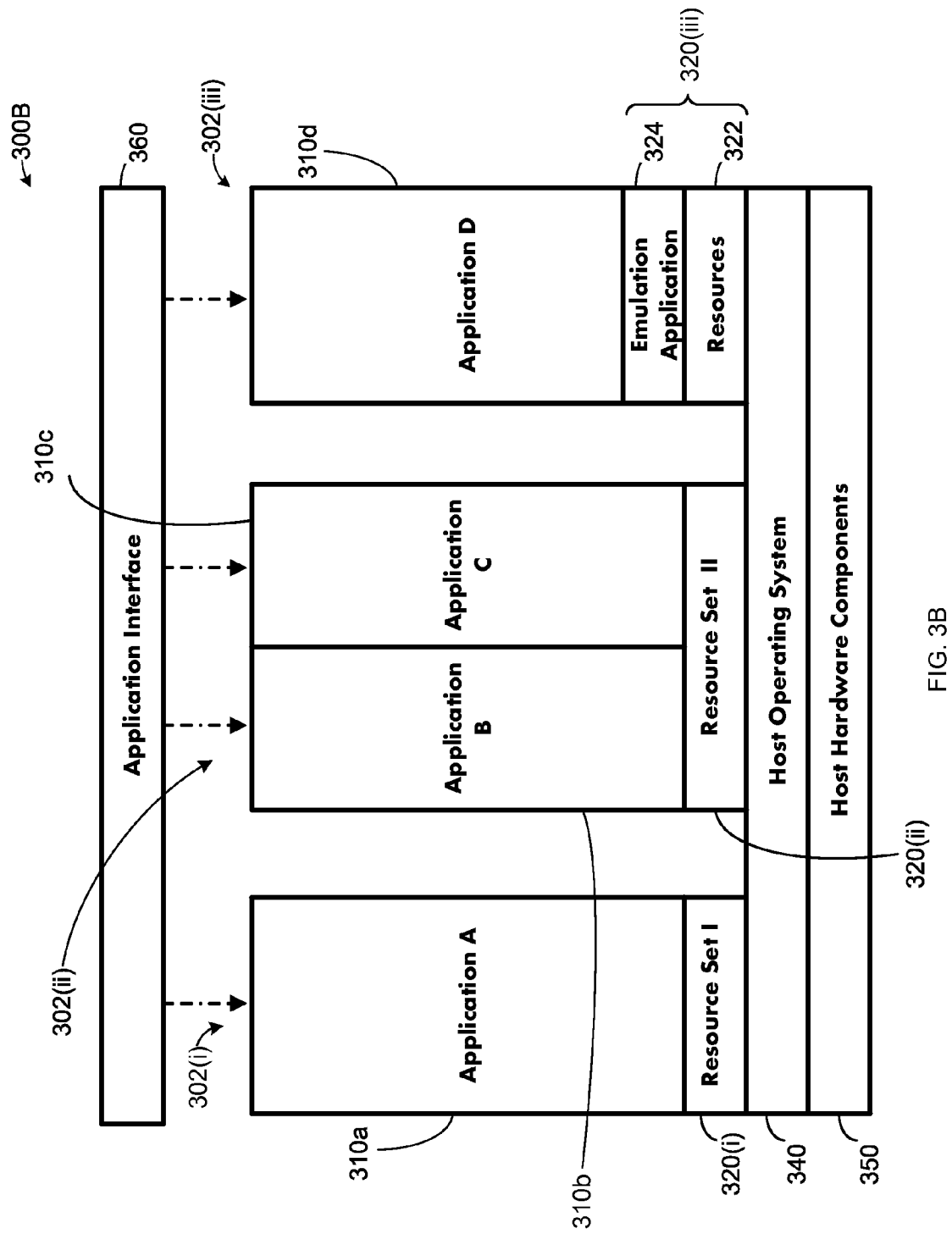

Reference is now made to FIG. 3A, which is an example computer architecture diagram 300A for the host computer system 140.

As shown in the computer architecture diagram 300, the host computer system 140 includes the host operating system 340 and host hardware components 350. The host hardware components 350 can include hardware components for supporting the operation of the host computer system 140, such as the host processor 142 and the host storage component 146. It will be understood that, depending on the host computer system 140, other hardware components may also be provided at the host computer system 140, such as sounds cards, video cards, optical drives, etc.

The host operating system 340 can provide basic operational processes and functionality for the host computer system 140. Example functionalities can include providing a file system for the host storage component 146, communicating with the host hardware components 350, communicating with the network 120 via the host interface component 144 (e.g., a network printer, etc.) and other operations associated with the various containerized resource instances that can be provided by the host computer system 140.

The host computer system 140 can operate to provide one or more software applications 310, such as "Application A" 310a, "Application B" 310b, "Application C" 310c, and "Application D" 310d. However, as shown in FIG. 3A, the host computer system 140 generally requires resources in addition to the host operating system 340 in order to provide the software applications 310. The additional resources may be specific to the requirements of the software applications 310 and/or the software architecture on which the software applications 310 are to be launched. Also, although only four different software applications 310a to 310d are shown in FIG. 3A, it should be understood that the host computer system 140 may operate to provide a fewer or greater number of software applications 310. The number of software applications 310 provided by the host computer system 140 may be limited by the computational and/or storage capacities of the host computer system 140.

For example, as shown in FIG. 3A, the host computer system 140 can determine from the resource library 150 that providing the software application 310a requires the resources in the resource set 'I' 320(i). To provide the software applications 310b and 310c, the host computer system 140 can determine from the resource library 150 that the resources in the resource set 'II' 320(ii) can be used for providing both software applications 310b and 310c. It is possible that software application 310a is configured for the same software architecture as software application 310b, but due to differences in the resources required for software application 310a and software application 310b, a different resource instance is provided for software application 310b.

For providing the software application 310d, the host computer system 140 can determine from the resource library 150 that the software application 310d is designed for a software architecture that is incompatible with the software architecture of the host operating system 340. That is, the software application 310d can be incompatible with the host operating system 340 when at least one resource of the resources 322 defined in the resource library 150 is inoperable at the host operating system 340.

For example, the software application 310d may be configured for operation on Android™ but the host operating system 340 may be Windows-based. The host processor 142 can then determine that an emulation application, such as 324, is required for facilitating compatibility between the host operating system 340 and the software application 310d since at least one resource of the resources 322 is inoperable on the host operating system 340. The emulation application 324 and the resources 322, together, may then form the resource set 320(iii) to be launched by the host processor 142 for providing the software application 310d.

The emulation application 324 may be stored at the host storage component 146 and /or the network storage component 130.

The emulation application 324 may operate to facilitate compatibility between specific types of operating systems, For example, one emulation application 324 may facilitate compatibility between only a Windows-based system and an Android™-based system, Whereas another emulation application 324 may facilitate compatibility between a Windows-based system and both an Android™-based system and a Mac™OSX-based system.

The emulation application 324 may be operable for providing a virtual platform using various virtualization techniques and/or tools. The virtual platform can operate as an interface tool between different software architectures, such as, but limited to, variations of Linux™, variations of Programmed Data Processors (PDP) architectures and other types of mainframe operating systems.

In some embodiments, the emulation application 324 required for facilitating compatibility may not be available. As a result, the host processor 142 and the host interface component 144 may operate to send an error message to the corresponding user device 110 via the network 120 to indicate that the requested software application 310 is unavailable.

FIG. 3B illustrates another example computer architecture diagram 300B for the host computer system 140. The computer architecture diagram 300B shown in FIG. 3B is generally similar to the computer architecture diagram 300A of FIG. 3A except the computer architecture diagram 300B includes the application interface 360. As described, the application interface 360 can operate to manage access to the various different software applications 310a to 310d being provided by the host computer system 140. The application interface 360 can include a manager application that operates to track the various different software applications being provided. The manager application may be operated by the host processor 142 for maintaining the session log 152 and also facilitating access to the various software applications 310.

With the application interface 360, the host computer system 140 may provide the user device 110A with access to both software applications 310a and 310b. The software applications 310a and 310b may be associated with different operating systems. For example, the software application 310a may be associated with Windows 7 and the software application 310b may be associated with Windows 8. Access to both software applications 310a and 310b may be desirable for a user operating the user device 110A to facilitate the migration of user data from an older operating system (e.g., Windows 7) to a new operating system (e.g., Windows 8™)

At 240, the host computer system 140 provides the requested software application 310 with the set of resources 320 identified at 230.

After identifying the set of resources 320 required for providing the software application 310, the host processor 142 can proceed to provide the software application 310 for the user device 110 using the identified set of resources 320.

The host processor 142 may, in some embodiments, operate to launch the identified set of resources as a containerized resource instance. Referring still to FIG. 3A, as shown, the example computer architecture diagram 300A for the host computer system 140 illustrates three different containerized resource instances 302(i), 302(ii) and 302(iii). Each containerized resource instance 302 generally corresponds to a launched instance of the set of resources 320 required for providing a corresponding software application 310. In some embodiments, a containerized resource instance 302 may also refer to a launched instance of the software application 310. Generally, each containerized resource instance 302 can be operationally isolated from one or more other containerized resource instances 302 being provided by the host computer system 140 so that the operations conducted by the host processor 142 for one containerized resource instance, such as 302(i), will not affect the operations conducted by the host processor 142 for another containerized resource instance, such as 302(ii). For example, if the containerized resource instance 302(i) is terminated due to an error in one of the resources in the corresponding resource set 420(i), the operation of the containerized resource instances 302(ii) and 302(iii) can continue as long as no failure errors occur in their respective resource sets 320(ii) and 320(iii).

To provide a containerized resource instance 302, the host processor 142 can allocate a portion of the host memory 154 to be dedicated for providing that software application 310. The allocated portion of the host memory 154 may be referred to as an application memory portion. The host processor 142 can then provide the software application 310 by launching the corresponding set of resources 320 within the application memory portion. With the containerized resource instances, the host computer system 140 can provide the software applications 310 without launching unnecessary resources and as a result, reduce use of computational and processing bandwidth.

By providing the software applications 310 with the containerized resource instances 302, the host computer system 140 may provide an enhanced user experience for the various users operating the user devices 110. No matter how reliable an electronic communication is between the user device 110 and the host computer system 140, it may be possible for a user device 110 to lose electronic communication with the host computer system 140 while the host computer system 140 is providing the software application 310 to the user device 110. With the containerized resource instances 302, certain memory portions and possibly other components at the host computer system 140 are dedicated for providing the software application 310 and thus, the host computer system 140 can continue to provide the containerized resource instances 302 for the corresponding user account even when the host computer system 140 detects that a corresponding user device 110 is no longer in electronic communication with the host computer system 140.

Despite detecting the user device 110 is no longer in electronic communication with the host computer system 140, the host computer system 140 can continue to provide the containerized resource instance 302 for a predefined time period and/or until a predefined event occurs. For example, the predefined time periods and predefined event may vary according to the user preferences corresponding to a particular user account and/or system settings. For example, a system setting may indicate that the host computer system 140 will terminate any containerized resource instance 302 when the corresponding user device 110 has lost electronic communication with the host computer system 140 for more than an hour. A user preference may indicate that the host computer system 140 should never terminate any containerized resource instance 302 until a specific input is received from that user account. Depending on the design and requirements of the host computer system 140 and/or the type of the user accounts, the host computer system 140 may be configured to prefer the system setting over user preferences, or vice versa, in the case of conflicting settings.

When the host computer system 140 detects the user device 110 has resumed electronic communication with the host computer system, the host computer system 140 can reinstate access to the previous one or more containerized resource instances 302 for the user device 110.

Figure 4:
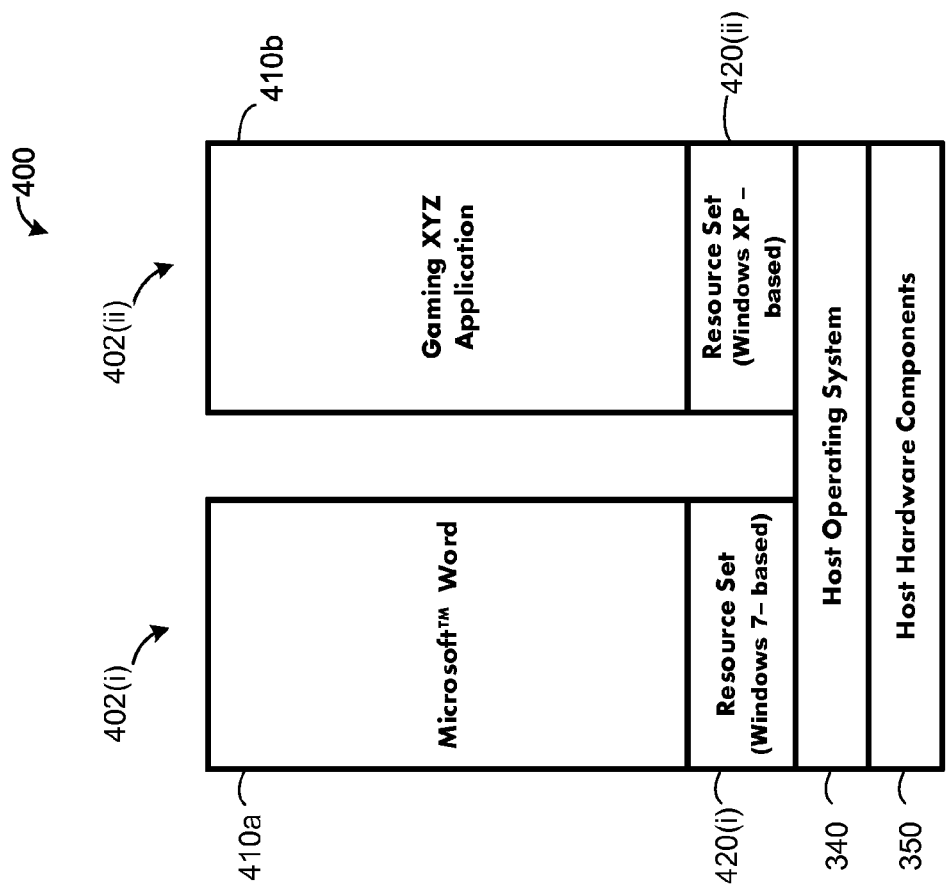
FIG. 4 is a computer architecture diagram of an example implementation of the host computer system of FIG. 3A in accordance with an example embodiment.

An example operation of the host computer server 140 for providing software applications 310 will now be described with reference to FIG. 4. FIG. 4 is another example computer architecture diagram 400 for the host computer system 140. Similar to the computer architecture diagram 300 in FIG. 3A, the computer architecture diagram 400 includes the host operating system 340 and the host hardware components 350.

In the example of FIG. 4, the host computer system 140 operates to provide two different containerized resource instances, namely 402(*i*) and 402(*ii*). Each containerized resource instance 402(*i*), 402(*ii*) is associated with a different software application, Microsoft WORD (software application 410*a*) and Gaming XYZ application (software application 410*b*), respectively.

The host computer system 140 can provide the software applications 410*a*, 410*b* in response to one or more application requests received from one or more user devices 110. In some embodiments, an application request received from one user device, such as 110A, can correspond to both software applications 410*a* and 410*b*.

In some embodiments, an application request corresponding to the software application 410*a* can be received from the user device 110A while an application request corresponding to the software application 410*b* can be received from the user device 110B. In response to the application request from the user device 110A, the host processor 142 can determine the application identifier in the application request corresponds to the software application 410*a*, Microsoft WORD. The host processor can then proceed to determine, from the resource library 150, that the resources required for providing software application 410*a* is the resource set 420(*i*).

In the example of FIG. 4, the resource set 420(*i*) determined for the software application 410*a* is associated with the application operating system, Windows 7. In some embodiments, the host processor 142 can determine that the software application 410*a* may be provided with resources associated with multiple different application operating systems. For example, the software application 410*a*, Microsoft WORD, may be provided with resources associated with various Windows-based operating systems, such as Windows 7, Windows XP, etc. In response to determining that different sets of resources may be available, the host processor 142 may select one set of resource based on predefined system settings or user preferences, or provide a selection interface for receiving a user selection of one of the resource sets from the user device 110.

As shown in FIG. 4, the host processor 142 is operated to launch the resource set 420(*i*) as the containerized resource instance 402(*i*) for providing the software application 410*a*. To provide the software application 410*b*, the host processor 142 can proceed to determine that the resource set 420(*ii*) is required for providing the software application 410*b*, and to launch the resource set 420(*ii*) as the containerized resource instance 402(*ii*).

By providing the software applications 410*a* and 410*b* with the corresponding containerized resource instances 402(*i*) and 402(*ii*), the host computer system 140 can operate to provide the software applications 410*a* and 410*b* so that the operation of the containerized resource instance 402(*i*) will not affect the operation of the containerized resource instance 402(*ii*). As described, each containerized resource instance 402(*i*), 402(*ii*) can be associated with a different application memory portion within the host memory 154. It may also be possible to dedicate certain processing bandwidth of the host processor 142 for each of the containerized resource instances 402(*i*) and 402(*ii*).

Figure 5:
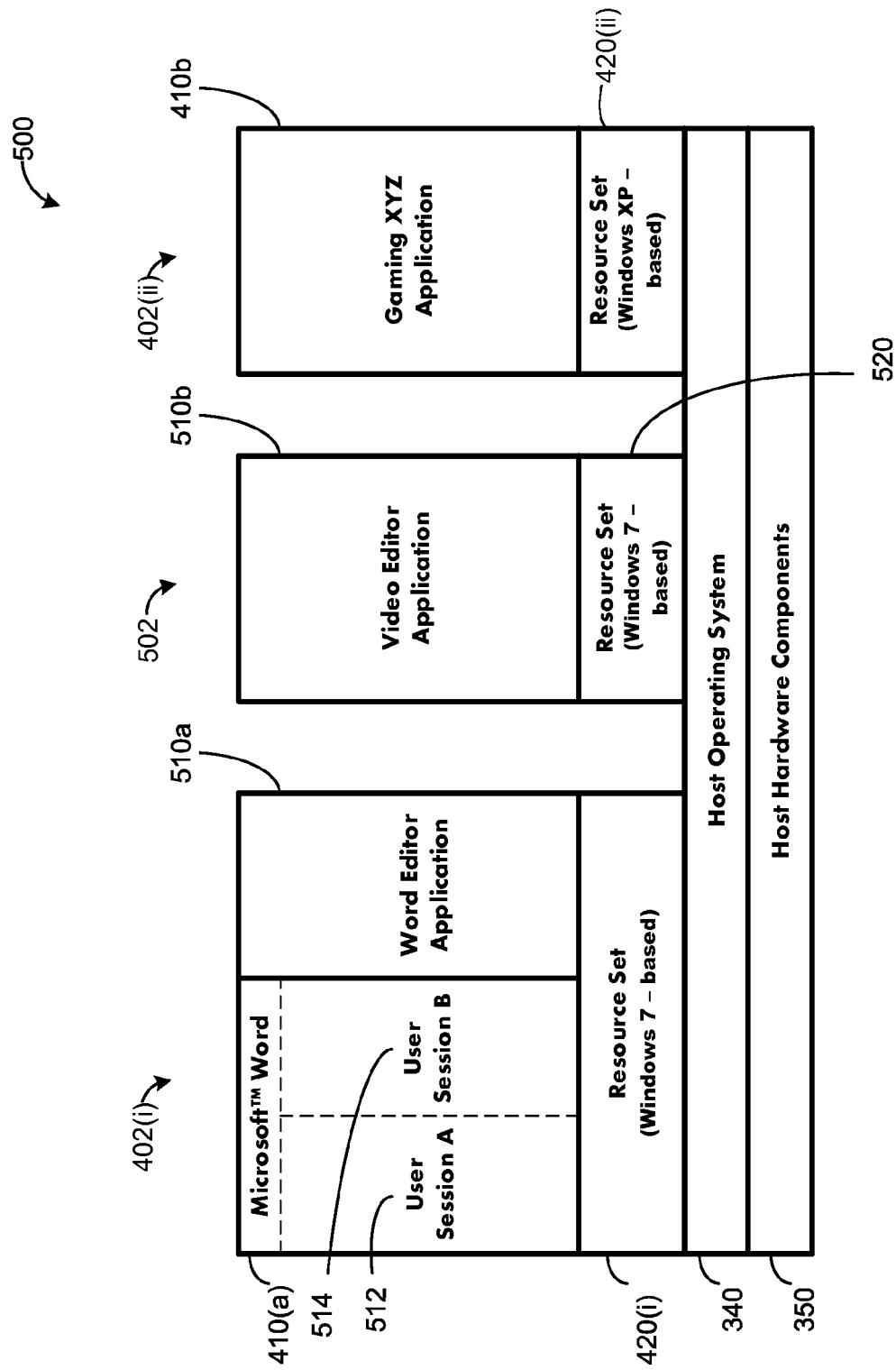
FIG. 5 is a computer architecture diagram of another example implementation of the host computer system of FIG. 3A in accordance with yet another example embodiment.

FIG. 5 is yet another example computer architecture diagram 500. The computer architecture diagram 500 continues from the example shown in FIG. 4.

When the software applications 410*a* and 410*b* are provided with the respective containerized resource instances 402(*i*) and 402(*ii*), respectively, the host computer system 140 can also store data associated with each of these containerized resource instances 402(*i*) and 402(*ii*) in the session log 152. These containerized resource instances 402(*i*) and 402(*ii*) can also be referred to as active containerized resource instances since the host computer system 140 is currently providing them for the user account associated with the respective user devices 110A, 110B. Each entry in the session log 152 can include various information associated with each active containerized resource instance 402, such as the resources launched for that containerized resource instance 402 and the associated user identifier.

With the session log 152, the host processor 142 can track and review the active containerized resource instances 402. In some embodiments, the host processor 142 may determine from the session log 152 at least one of the active containerized resource instance 402 that can be used to fulfil another application request. That is, if the resources launched for one of the active containerized resource instances 402 correspond to a set of resources required for providing a newly requested software application 310, the host processor 142 may provide the newly requested software application 310 with that active containerized resource instance 402. Otherwise, the host processor 142 can proceed to provide the newly requested software application 310 by launching the corresponding set of resources 320 as a new containerized resource instance 302.

Referring still to FIG. 5 and continuing with the example shown in FIG. 4, the host computer system 140 may receive another application request corresponding also to the software application 410a, Microsoft WORD, but from another user account via the user device 110B. Before the host processor 142 operates to launch the resource set 420(i) as a new containerized resource instance 402 for providing the software application 410a (Microsoft WORD), the host processor 142 may determine, from the session log 152, that the active containerized resource instance 402(i) is also associated with the resource set 420(i). As described with respect to FIG. 4, the host computer system 140 is currently providing the software application 410a (Microsoft WORD) with the containerized resource instance 402(i). Therefore, from the session log 152, the host processor 142 can determine that the software application 410a can also be provided for the user device 110B using the containerized resource instance 402(i). As shown in FIG. 5, different user sessions can be provided in the containerized resource instance 402(i)—a user session 512 can be provided for the user device 110A and a user session 514 can be provided for the user device 110B, in this example.

Another example application request received by the host computer system 140 may be associated with another software application 510a, such as "Word Editor Application". From the resource library 150, the host processor 142 may determine that the resource set 320 required for providing the software application 510a is the resource set 420(i). Before launching the resource set 420(i) as a new containerized resource instance 302, the host processor 142 may determine that the active containerized resource instance 402(i) is associated with resources within the resource set 420(i), and can therefore provide the software application 510a with the active containerized resource instance 402(i).

Continuing with reference to FIG. 5, the host computer system 140 may receive another application request associated with a software application 510b, such a "Video Editor Application". From the resource library 150, the host processor 142 may determine that the resource set required for providing the software application 510b is the resource set 520. Although, like the resource set 420(i), the resource set 520 is also associated with the Windows 7 software architecture, the resource set 520 includes one or more resources that are specific to the software application 510b that are not present in the resource set 420(i). For example, the resource set 520 may include resources for encoding and/or decoding multimedia video files, which are required for providing the software application 510b (a video editor application), but are not required for providing the software application 510a (a word editor application). Therefore, the host processor 142 can proceed to provide the software application 510b by launching the resource set 520 as a new containerized resource instance 502.

Figure 6:
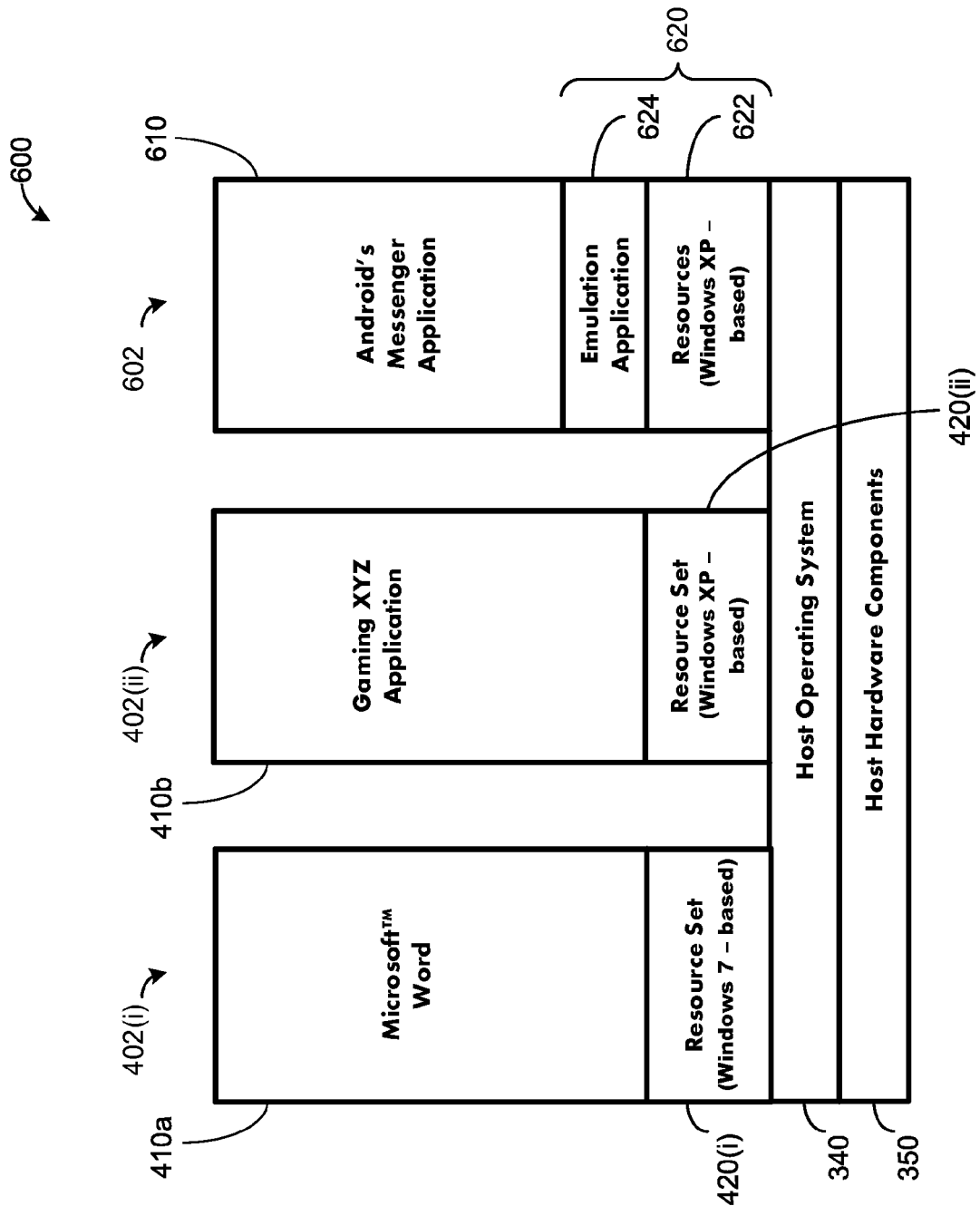
FIG. 6 is a computer architecture diagram of another example implementation of the host computer system of FIG. 3A in accordance with a further example embodiment.

FIG. 6 is another example computer architecture diagram 600 and, like the computer architecture diagram 500 of FIG. 5, the computer architecture diagram 600 continues from the example shown in FIG. 4.

As described with reference to FIG. 3A, the host computer system 140 may receive an application request associated with a software application that is configured for an application operating system that is incompatible with the host operating system 340. For example, in the example of FIGS. 4 to 6, the host operating system 340 is Window Server 2008, and the application operating system for a newly requested software application may be Android. The resources required for the newly requested software application are, therefore, inoperable on the host operating system 340 of this example.

Referring now to FIG. 6 and continuing with the example shown in FIG. 4, the host computer system 140 may receive an application request associated with a software application 610 configured for the Android software architecture, such as "Android's Messenger Application". From the resource library 150, the host processor 142 may determine the resources 622 required for providing the software application 610. The host processor 142 may also determine from the resource library 150 that, at least one of the resources 622 is inoperable on the host operating system 340 (Windows Server 2008) since the software application 610 is configured for Android. The host processor 142 can then determine that the emulation application 624 is required for facilitating compatibility between the software application 610 and the host operating system 340. The resource set 620 for providing the software application 610 can include the resources 622 and the emulation application 624.

Various embodiments have been described herein by way of example only. Various modification and variations may be made to these example embodiments without departing from the spirit and scope of the invention, which is limited only by the appended claims.

We claim:

1. A method for providing one or more software applications at a host computer server, the host computer server having, at least, a host memory for storing a host operating system and a host processor configured for operating the host operating system, the method comprising:

receiving a software application request from a user device, the software application request comprising an application identifier associated with a requested software application, the requested software application being a software application to be executed at the host computer server, the user device comprising a device processor and a device memory;

providing a resource library for the host computer server, the resource library defining one or more resources required for providing each software application of the one or more software applications;

identifying, from the resource library, a set of resources required for providing the requested software application based on the application identifier, the set of resources comprising at least one application resource and at least one host resource, wherein:

the at least one application resource comprises one or more resources required for an application operating system to support the requested software application and is absent from the host operating system;

the at least one host resource comprises one or more resources required for the application operating system to support the requested software application and is provided by the host operating system, and the application operating system is an operating system operable for providing the requested software application and the application operating system is different from the host operating system; and providing the requested software application with the identified set of resources for execution on the host operating system, wherein providing the requested software application comprises accessing the at least one application resource and operating the host processor to launch the set of resources as a containerized resource instance for providing the requested software application, the containerized resource instance being operationally isolated from other containerized resource instances, the other containerized resource instances including at least one other containerized resource instance for providing one or more other software applications that do not require the at least one application resource, and the at least one application resource is not launched in the at least one other containerized resource instance; and prior to operating the host processor to launch the set of resources as the containerized resource instance for providing the requested software application providing a session log for the host computer server, the session log recording one or more active containerized resource instances and, for each active containerized resource instance, one or more resources associated with that active containerized resource instance, the one or more active containerized resource instances being containerized resource instances currently provided by the host computer server;

determining, from the session log, whether the one or more resources associated with at least one active containerized resource instance corresponds to the identified set of resources; and in response to determining the one or more resources associated with at least one active containerized resource instance corresponds to the identified set of resources, providing the requested software application with one of the at least one active containerized resource instance, otherwise, operating the host processor to launch the set of resources for providing the requested software application as a new containerized resource instance.

2. The method of claim 1, further comprising:
providing an application interface at the host computer server, the application interface facilitating electronic communication between the one or more active containerized resource instances and the user device.

3. The method of claim 1, wherein operating the host processor to launch the set of resources as the containerized resource instance comprises:
allocating an application memory portion within the host memory for launching the set of resources, the application memory portion being dedicated for providing the requested software application and each containerized resource instance being associated with a different application memory portion within the host memory; and
launching the set of resources within the application memory portion.

4. The method of claim 1, wherein:
the software application request comprises a user identifier corresponding to a user account from which the software application request was received; and
providing the requested software application with the identified set of resources comprises:
providing a session log for the host computer server, the session log recording the user identifier in association with the containerized resource instance providing the requested software application; and
upon detecting the user device is not in electronic communication with the host computer server, continuing to provide the requested software application with the containerized resource instance for that user account.

5. The method of claim 1, wherein identifying the set of resources required for providing the requested software application based on the application identifier comprises:
determining the requested software application is incompatible with the host operating system when at least one resource of the set of resources identified for the requested software application is inoperable at the host operating system; and
if the requested software application is incompatible with the host operating system, then identifying an emulation application operable for providing the software application at the host operating system, the emulation application being operable for facilitating compatibility between the host operating system and the requested software application, otherwise, sending an error message to the user device to indicate the requested software application is unavailable.

6. The method of claim 1, wherein the one or more resources identified in the resource library comprises at least one of a binary file and a library file.

7. The method of claim 1, wherein the set of resources comprises at least the requested software application.

8. The method of claim 1, wherein the host operating system is based on a Microsoft™ Windows™ Server architecture and the application operating system is based on a Microsoft™ Windows ™ architecture.

9. The method of claim 1, wherein providing the resource library comprises:
generating one or more resource templates, each resource template being a predefined resource set launchable by the host processor for providing at least one software application, the predefined resource set including one or more resources required for providing the at least one software application.

10. The method of claim 9, wherein the one or more resource templates comprises at least one resource template launchable by the host processor for providing the at least one software application on a Windows-based operating system.

11. The method of claim 1, wherein accessing the at least one application resource comprises accessing the at least one application resource stored remotely from the host computer server.

12. The method of claim 1, wherein the one or more resources of the at least one application resource are part of the application operating system.

13. A system for providing one or more software applications, the system comprising:
at least one storage component including a host memory for storing, at least, a host operating system and a resource library defining one or more resources required for providing each software application of the one or more software applications; and a host processor configured for operating the host operating system, the host processor being further configured to:
  receive a software application request from a user device, the software application request comprising an application identifier associated with a requested software application, the requested software application being a software application to be executed by the system;
  identify, from the resource library, a set of resources required for providing the requested software application based on the application identifier, the set of resources comprising at least one application resource and at least one host resource, wherein:
    the at least one application resource comprises one or more resources required for an application operating system to support the requested software application and is absent from the host operating system;
    the at least one host resource comprises one or more resources required for the application operating system to support the requested software application and is provided by the host operating system, and
    the application operating system is an operating system operable for providing the requested software application and the application operating system is different from the host operating system;
  provide the requested software application with the identified set of resources for execution on the host operating system, wherein providing the requested software application comprises accessing the at least one application resource; and
  launch the set of resources as a containerized resource instance for providing the requested application, the containerized resource instance being operationally isolated from other containerized resource instances being provided, the other containerized resource instances including at least one other containerized resource instance for providing one or more other software applications that do not require the at least one application resource, and the at least one application resource is not launched in the at least one other containerized resource instance;
wherein
  the at least one storage component further comprises a session log for recording one or more active containerized resource instances and, for each active containerized resource instance, one or more resources associated with that active containerized resource instance, the one or more active containerized resource instances being containerized resource instances currently provided by the host computer server; and
  the host processor is configured, prior to launching the set of resources as the containerized resource instance for providing the requested software application, to:
    determine, from the session log, whether the one or more resources associated with at least one active containerized resource instance corresponds to the identified set of resources; and
    in response to determining the one or more resources associated with at least one active containerized resource instance corresponds to the identified set of resources, provide the requested software application with one of the at least one active containerized resource instance, otherwise, the host processor is configured to launch the set of resources for providing the requested software application as a new containerized resource instance.

14. The system of claim 13, wherein the at least one storage component comprises a host memory for storing the host operating system and one or more storage components for storing the resource library, the one or more storage components being physically separate from the host memory.

15. The system of claim 13, wherein the host processor is further configured to provide an application interface for facilitating electronic communication between the one or more active containerized resource instances and the user device.

16. The system of claim 13, wherein the host processor is further configured to:
  allocate an application memory portion within the at least one storage component for launching the set of resources, the application memory portion being dedicated for providing the requested software application and each containerized resource instance being associated with a different application memory portion within the at least one storage component; and
  launch the set of resources within the application memory portion.

17. The system of claim 13, wherein:
  the software application request comprises a user identifier corresponding to a user account from which the software application request was received;
  the at least one storage component further comprises a session log for recording the user identifier in association with the containerized resource instance providing the requested software application; and
  the host processor is further configured, upon detecting the user device is not in electronic communication with the system, to continue to provide the requested software application with the containerized resource instance for that user account.

18. The system of claim 13, wherein the host processor is configured to:
  determine the requested software application is incompatible with the host operating system when the requested software application is operable on a software architecture different from a software architecture of the host operating system; and
  if the requested software application is incompatible with the host operating system, then identify an emulation application operable for providing the software application at the host operating system, the emulation application being operable for facilitating compatibility between the host operating system and the requested software application, otherwise, the host processor is configured to send an error message to the user device to indicate the requested software application is unavailable.

19. The system of claim 13, wherein the one or more resources identified in the resource library comprises at least one of a binary file and a library file.

20. The system of claim 13, wherein the set of resources comprises at least the requested software application.

21. The system of claim 13, wherein the host operating system is based on a Microsoft™ Windows™ Server architecture and the application operating system is based on a Microsoft™ Windows™ architecture.

22. The system of claim 13, wherein the host processor is configured to:
  generate one or more resource templates, each resource template being a predefined resource set launchable by the host processor to provide at least one software application, the predefined resource set including one or more resources required for providing the at least one software application.

23. The system of claim 22, wherein the one or more resource templates comprises at least one resource template launchable by the host processor to provide the at least one software application on a Windows-based operating system.

24. The system of claim 13, wherein accessing the at least one application resource comprises accessing the at least one application resource stored remotely from the system.

25. The system of claim 13, wherein the one or more resources of the at least one application resource are part of the application operating system.

\* \* \* \* \*